United States Patent
Kryka et al.

(10) Patent No.: US 6,832,369 B1
(45) Date of Patent: Dec. 14, 2004

(54) OBJECT ORIENTED METHOD AND APPARATUS FOR CLASS VARIABLE INITIALIZATION

(75) Inventors: James Albert Kryka, Rochester, MN (US); Scott Thomas Robinson, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 09/630,376

(22) Filed: Aug. 1, 2000

(51) Int. Cl.[7] .................................................. G06F 9/45
(52) U.S. Cl. ...................................................... 717/140
(58) Field of Search ................................ 717/124, 127, 717/140, 144, 146, 148, 151, 152, 154, 156

(56) References Cited

U.S. PATENT DOCUMENTS

| | | | | |
|---|---|---|---|---|
| 4,567,574 A | * | 1/1986 | Saade et al. ................. | 717/155 |
| 5,367,685 A | * | 11/1994 | Gosling ........................ | 717/148 |
| 5,907,709 A | * | 5/1999 | Cantey et al. ............... | 717/141 |
| 5,991,540 A | * | 11/1999 | Radigan ...................... | 717/158 |
| 6,061,520 A | * | 5/2000 | Yellin et al. ................. | 717/148 |
| 6,230,314 B1 | * | 5/2001 | Sweeney et al. ............ | 717/108 |
| 6,327,699 B1 | * | 12/2001 | Larus et al. ................. | 717/128 |
| 6,412,108 B1 | * | 6/2002 | Blandy et al. ............... | 717/152 |
| 6,463,581 B1 | * | 10/2002 | Bacon et al. ................ | 717/154 |

OTHER PUBLICATIONS

"Microsoft Systems Journal", Issue Feb. 1997, Article "Q&A C++" by Paul DiLascia.*
"Efficient Memory Programming" by David Loshin, 1999.*
"Construction and Destruction of Statics in the WATCOM C++ Compiler", by James W. Welsh. WATCOM International Corp.*
"Initialization Problems for Java"by Egon Borger. 1999. Software—Concepts & Tools. vol. 20, No. 4.*

* cited by examiner

Primary Examiner—Wei Y. Zhen
(74) Attorney, Agent, or Firm—Roy W. Truelson (57) ABSTRACT

A compiler for object-oriented programming code in a language which employs run-time static initialization semantics analyzes the static initialization code to find a subset of initialization statements which must execute under all conditions, creates an pre-initialized image of the static storage using the subset, and removes statements which were pre-initialized from the final compiled code. Preferably, the compiler is a back-end compiler for the Java language, which converts Java bytecode into machine executable instructions. A static initializer method for each class is decomposed to construct a control flow graph for the method, which is then analyzed to identify statements in the source which must necessarily execute whenever the initialization method is called. The compile-time static storage image is pre-initialized to zero, except where affected by these identified statements, which are set at compile time as if the identified statements had executed. The identified statements are then removed from the code being compiled. Code size is thus reduced at the same time that performance at run time is improved as a result of not having to execute the removed initialization statements.

16 Claims, 8 Drawing Sheets

OBJECT ORIENTED METHOD AND APPARATUS FOR CLASS VARIABLE INITIALIZATION

FIELD OF THE INVENTION

The present invention relates to digital data processing systems, and in particular to the initialization of static data in object oriented systems.

BACKGROUND OF THE INVENTION

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run an operating system, and under the control of the operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

The JAVA™ programming language developed by Sun Microsystems is one modern object oriented programming language that has become very popular in recent years. One key feature of the JAVA language is the platform independence of JAVA source code. I.e., source code complying with the JAVA language semantics may be compiled and executed on any JAVA compliant machine. In fact, source code is typically converted by a JAVA front-end compiler to an intermediate symbolic form referred to as a JAVA bytecode form, which is also platform independent. Programming code in JAVA bytecode form may be run in interpretive mode by any JAVA compliant interpreter, or may be compiled into machine level instructions by a back-end compiler for use in a specific type of computer system environment.

JAVA language semantics support the use of static class variables. A static class variable is a variable which has a value defined for the entire class, as opposed to object variables which may assume different values for each object of the class. Typically, all class variables for a given class are stored together in a common class variable structure.

JAVA language semantics do not dictate the layout or format of any particular class variable structure. For maximum portability and platform independence, JAVA language semantics define static class variables as initialized to zero, except insofar as altered by a static initializer method. The static initializer method (<clinit>) for a class is called once during program execution when the class is first loaded. The static initializer method is computer programming code like any other, the purpose of which is merely to initialize the static class variables. As such, it may contain simple assignment statements, but may also contain statements requiring arithmetic calculations, loops, branches, and similar programming constructs. For example, an array may be initialized using loops.

The JAVA language's static variable initialization semantics differ from those of many other languages, particularly C++. In C++, static variables are typically declared and initialized when the program is compiled. It is therefore not necessary to execute static variable initialization code in C++ to the extent that it is required in the JAVA language. In the JAVA language, the code required to initialize static variables may consume considerable space in the final compiled program module. Moreover, the JAVA language initialization code must execute at run time, which consumes a certain amount of execution time. This need to initialize static variables in the JAVA language at run time puts the performance of compiled JAVA language code at a disadvantage compared with the performance of code compiled in languages such as C++. It would be desirable to reduce the burden of static initialization methods on code size and run-time performance of JAVA language programs (and programs written in languages having similar static initialization semantics), without altering the standard JAVA language definition.

SUMMARY OF THE INVENTION

In accordance with the present invention, a compiler for object-oriented programming code in a language which employs run-time static initialization semantics (such as the JAVA language) analyzes the static initialization code to find a subset of initialization statements which must execute under all conditions, creates an image of the static storage in which the variables initialized by statements in the subset are pre-initialized at compile time, and removes statements in the subset from the final compiled code of machine level instructions.

In the preferred embodiment, the compiler is a back-end compiler for the JAVA language, which converts a JAVA bytecode module to a compiled module of machine executable instructions. Static initialization code for each class is contained in a static initializer method for the class. Each static initializer method is decomposed to construct a control flow graph for the method. The control flow graph is analyzed to identify statements in the JAVA bytecode initialization source which must necessarily execute whenever the initialization method is called. The compile-time "class variable structure" (i.e., the image of the static storage) is set everywhere to zero, except for locations affected by these identified statements, which are set at compile time according to the identified statements, i.e., as if the identified statements had executed. The identified statements are then removed from the code being compiled, so that they do not appear in the finished compiled code.

Because the analysis performed by the compiler is finite in scope, and because certain statements might be inappropriate for incorporation into a compile time class variable structure, the compiler of the preferred embodiment does not necessarily guarantee that every statement which must necessarily execute will be identified and incorporated into the compile-time class variable structure. However, in order to maintain compatibility with the JAVA language standard, it should guarantee that every statement which is so incorporated into the compile-time class variable structure must necessarily execute.

As a result of removing statements from the static initialization routines, code size is generally reduced. At the same time, performance at run-time is improved because there are fewer initialization instructions to execute.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

OVERVIEW

The present invention relates to object oriented programming techniques. For those individuals who are not generally familiar with object oriented programming, the Overview section below presents many of the concepts that will help to understand the invention.

Object Oriented Technology v. Procedural Technology

Object oriented programming is a method of implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Said another way, object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code that provides one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requestor of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system a "client object" in one location calls methods on a "server object" in another location, which may be a remote location. The client object-server object interactions form the basis for the distributed object system.

Another central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code. Each class has corresponding configuration data that determines the features or attributes of the class. Changing the configuration data for a class changes the existing class to a new class.

There are many computer languages that currently support object oriented programming techniques. For example, Smalltalk, Object Pascal, C++ and JAVA are all examples of programming languages that support object oriented programming to one degree or another.

JAVA Programming Language

The JAVA language is a modern object oriented programming language designed by Sun Microsystems that has grown in popularity in recent years. The JAVA language offers many features and advantages that makes it a desirable programming language to use. First, the JAVA language is specifically designed to create small application programs, commonly called "applets," that can reside on the network in centralized servers, and which are delivered to the client machine only when needed. Second, the JAVA language is completely platform independent. A JAVA program can be written once and can then run on any type of platform that contains a JAVA Virtual Machine (JVM). The JVM model is supported by most computer vendors, thereby allowing a software vendor to have access to hardware and software systems produced by many different companies. Finally, the JAVA language is an object oriented language, meaning that software written in the JAVA language can take advantage of the benefits of object oriented programming techniques.

As in other object oriented systems, operations in the JAVA language are performed by one object calling a method on another object. These objects can reside locally on the same machine or on separate JVM's physically located on separate computers or systems.

Platform Independence and Compilation in the JAVA Language

As can be appreciated, source code of any language which has a rigorous and consistent definition is platform independent in the sense that it can be taken from one machine to another, and interpreted or compiled on the second machine assuming that the second machine has an appropriate interpreter or compiler which complies with the language definition. The JAVA language further defines an intermediate language form, referred to as JAVA bytecode form, which is also platform independent. A JAVA front-end compiler parses JAVA source to render the source in JAVA bytecode form. The bytecode form expresses commands as numeric codes having a predetermined placement of bit fields. The bytecode form can thus be executed far more efficiently by an interpreter than can ordinary source code, since it is not necessary to parse the code, remove unnecessary characters, convert strings to commands, etc.

While the JAVA bytecode form is platform independent and achieves substantial performance improvement in interpretive mode over ordinary source code, it still lacks the performance of typical compiled code (i.e., directly executable code, or "object code"). As more and complex applications have been written in the JAVA language, it is only natural that programmers have asked for compilation tools which will render JAVA source or JAVA bytecode programs into compiled, executable code. However, here a trade-off must be made. Directly executable compiled code (object code) is always machine dependent, since it depends on the machine executable instruction set, the number of available hardware registers, and many other machine-specific factors. When JAVA bytecode programs are compiled into directly executable object code, platform independence is inevitably lost.

Static Storage Initialization in the JAVA Language

The JAVA programming language employs run-time static initialization semantics, i.e., the language definition includes various run-time static initialization statements, and it is intended that these statements be executed at run-time in order to establish the initial (non-zero) values of static variables. Run-time static initialization statements may take the form of simple assignment statements, but may also take the form of statements requiring arithmetic calculations, or branches or other statements which execute conditionally, as is common for conventional programming code. Thus, the collection of static initialization statements may be viewed as a program within a program, the purpose of which is to generate a set of static variables having an initial set of values.

In the JAVA language, static initialization code is placed in special methods, each of which has the name <clinit>. There is at most one <clinit> method for each JAVA class (it being possible that no initialization method is required for a class). The <clinit> method for a particular class is responsible for initializing the set of static class variables for that class, and is called once to perform initialization when the class is first loaded. A class variable is one which is scoped to a class rather than an instance (object) of the class. I.e., there is one class variable of a given identity (be it a scalar, an array, or a complex data structure) for the class as a whole, rather than one class variable for each instance of the class. Typically, all class variables for a given class are stored together in a static storage area, herein called a "class variable structure". As used herein, "class variable structure" is the static storage area for the class variables, which may or may not be a single contiguous block of storage, and in particular includes scalar class variables, pointers to arrays, and the array elements themselves. Thus, the <clinit> method for a particular class initializes the class variable structure for that class.

The JAVA language definition defines initialization statements in a <clinit> method as run-time executable, meaning that they behave in the manner of things done at run-time. Thus, initialization statements may cause certain exceptions or errors to occur. For example, an initialization statement may cause a divide by zero error, an array out of bounds condition, a stack overflow, an out of memory (heap overflow) condition, or other conditions. The language defines the errors or exceptions that must be taken on the occurrence of any of these conditions.

To comply with the JAVA language's definition, a JAVA compiler typically generates run-time code which allocates a static storage area for the class variable structure from the heap, initializing it to all zeroes (the default required by JAVA program semantics). When the <clinit> method is called, the method operates on this static storage area to initialize it to whatever non-zero values are required by the execution of the initialization statements.

In order for a compiler to comply with a language definition, it must generate code which will produce the results required by the language definition. However, it is not necessarily true that it has to produce these results in exactly the same manner envisioned by the designers of the language. The primary output of the <clinit> method is a class variable structure initialized in accordance with the initialization statements contained in the method. (Although exceptions and the like are possible outputs as well.) Thus, if compiled code produces exactly the same results, i.e. initialized class variable structure and other outputs, as would be produced by executing initialization statements at run-time in accordance with the JAVA language definition, then the code is JAVA compliant, even if it does not actually execute some or all of the initialization statements at run-time. This insight provides rationale for the present invention. The details of the preferred embodiments are described below.

DETAILED DESCRIPTION

An apparatus and method in accordance with the preferred embodiments provide an improvement to the prior art JAVA compilation and run-time initialization of class variables by creating a compile-time image of the class variable structure, by identifying certain selected initialization assignments (as described more fully herein) that must execute under all conditions when the <clinit> method is called, and by initializing the compile-time image of the class variable structure of the selected initialization assignments. Any assignments which are not among the selected group are compiled as run-time executable initialization statements in the conventional manner. By removing some assignments from the initialization method and pre-initializing the class variable structure, run-time performance is improved and code size may be reduced.

Figure 1:
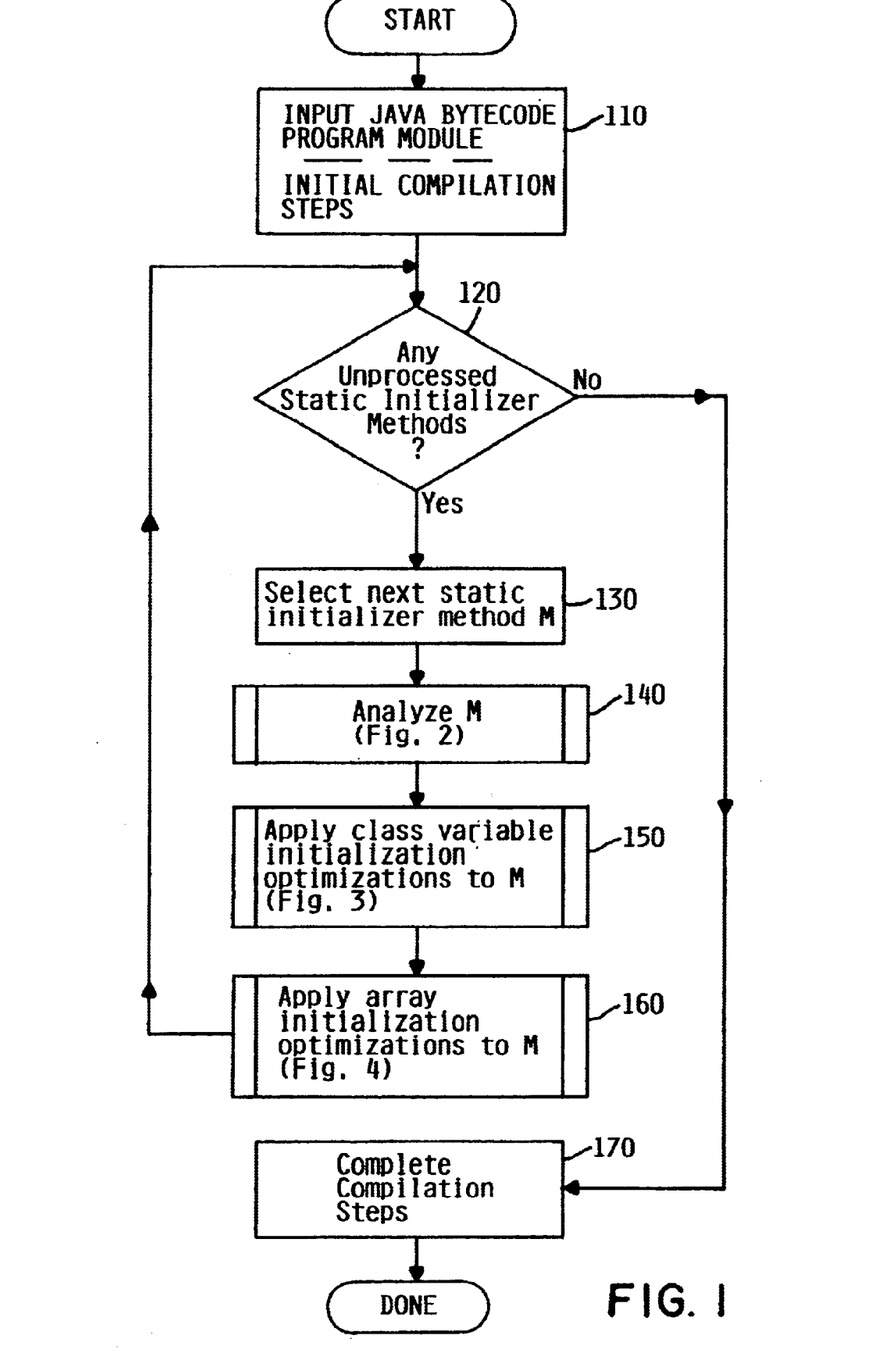
FIG. 1 is a high-level flow diagram illustrating the process of compiling an object-oriented program, according to the preferred embodiment of the present invention.

Referring to FIG. 1, a method for compiling a JAVA code in accordance with the preferred embodiments is shown at a high level. In the preferred embodiment, JAVA source in human-readable form is first converted to JAVA intermediate bytecode form by a JAVA front-end compiler (these steps not being shown). The compilation described herein preferably operates on a JAVA bytecode form program module as its source. Static variable initialization in accordance with the preferred embodiment is just of one of many steps performed during compilation, it being understood that some of these other steps will be performed before the static variable initialization steps, and some will be performed after. These other steps are known to those skilled in the compiler art, and are not described in detail herein; they are represented at a high level in FIG. 1 by steps 110 and 170.

The JAVA bytecode program module is initially input to the compiler for compilation, and the compiler processes the program module to the point where it is necessary to process the <clinit> static initializer methods (step 110). If there are any static initializer methods remaining to be processed (step 120), the next static initializer method is selected for processing (step 130). Note that each JAVA class may have at most one <clinit> method, but is not required to have any.

The compiler then analyzes the selected <clinit> method to identify initialization statements which are candidates for pre-initialization at compile time rather than at run-time. This process is depicted at a high level as step 140 in FIG. 1, and is shown in greater detail in FIG. 2.

Figure 2A:
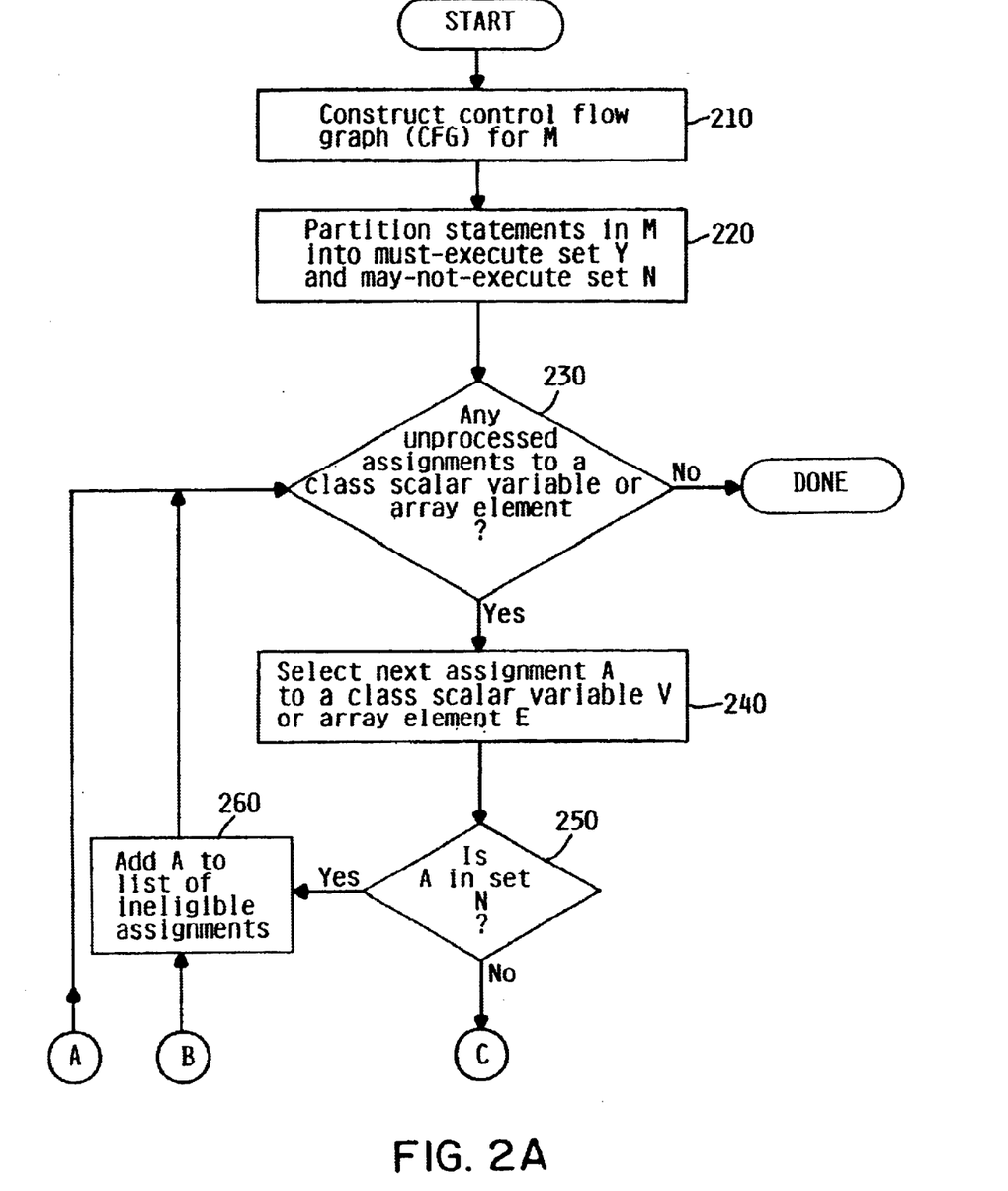
FIG. 2 is a flow diagram illustrating the process of identifying initialization statements within a static initializer method which are candidates for pre-initialization at compile time, according to the preferred embodiment.
Figure 2B:
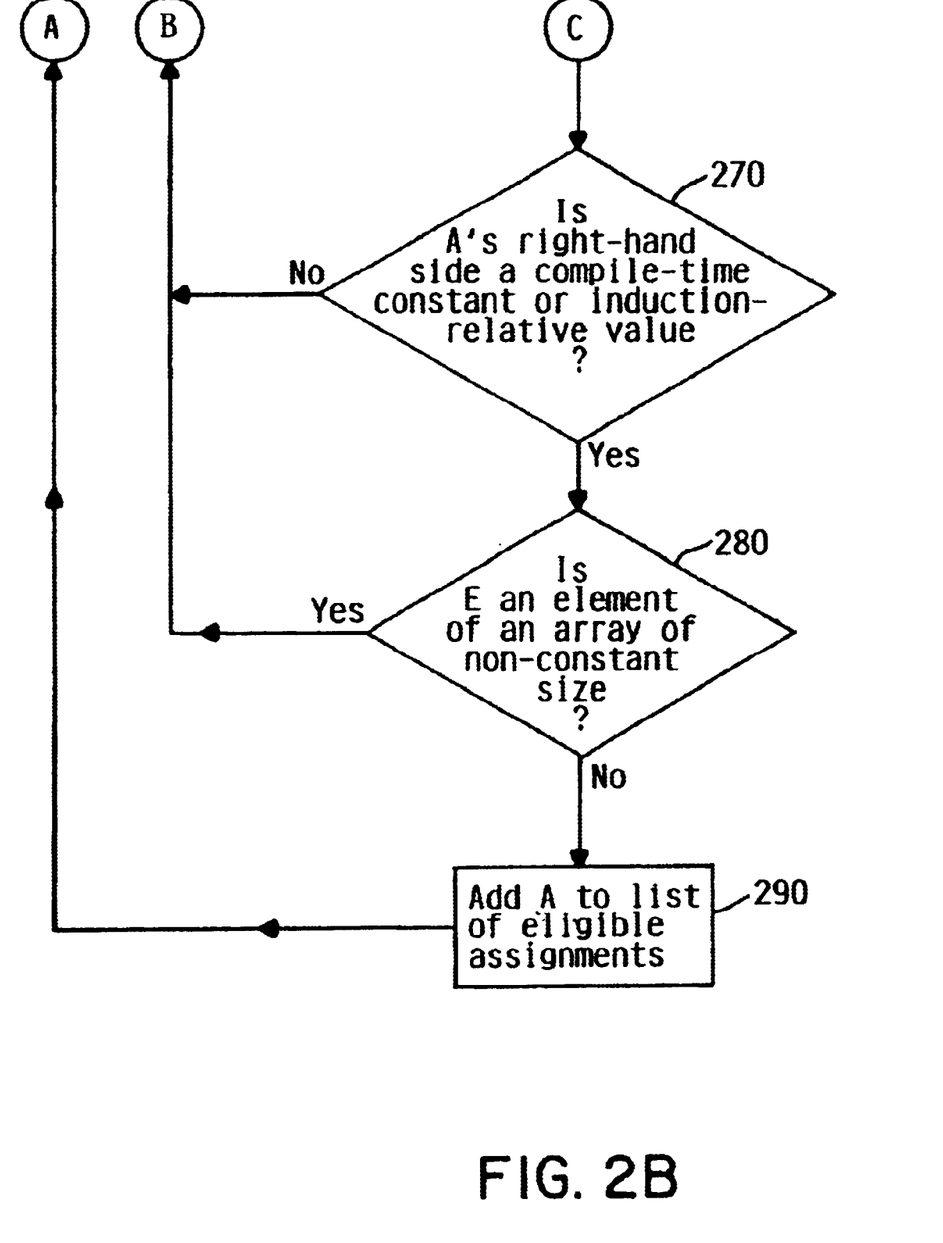

Referring to FIG. 2, the compiler constructs a control flow graph for the <clinit> method M (step 210). A control flow graph is a data structure used by compilers to represent the structure of a method being compiled. The control flow graph is built by first dividing the method's code into "basic blocks". A basic block is a set of consecutive instructions which are always executed together (in the absence of exception conditions), i.e., the basic block has one entry point and one exit point, and upon entering the block at the entry point, all instructions in the block will be executed to and including the instruction at the exit point. The control flow graph is a directed graph containing one node for each basic block in the method. There is an edge from node A to node B if the basic block represented by node B can be executed immediately after basic block A has been executed.

The compiler then uses the control flow graph method to divide the statements in method M into two sets, a set of statements Y which must execute under all conditions, and a set N of all remaining statements (step 220). Ideally, the "must-execute" set Y consists of all statements which are guaranteed to be executed if method M is entered. Put another way, a statement S is in the must-execute set Y if and only if (a) every path in the control flow graph from the entry point of method M to an exit from method M contains statement S; and (b) there is no path from the entry point of method M to statement S that passes through an instruction which may cause an exception before reaching S the first time. In all other cases, statement S is in the set N of all remaining statements.

The analysis being finite in scope, it is not necessarily the case that every statement in method M which must execute is in set Y, although every statement in set Y must execute.

The analysis relies on the edges of the control flow graph. An edge from block A to block B exists if there is any possible condition under which block B executes immediately after block A. However, the mere fact that there is a possible condition (e.g., a conditional branch instruction) which supports an edge does not mean that any arbitrary path of edges can actually occur under run-time conditions. As a practical matter, it is not considered worthwhile to analyze actual run-time conditions, and so in rare cases an instruction which could be placed in set Y is not. It will be observed that this does not affect the validity of the generated code; at worst, the consequence is that an instruction which could have been removed from the run-time executable code by pre-initialization of the class variable structure is instead executed at run-time.

The compiler then processes each assignment statement in M in turn until done. I.e., at step 230, if any unprocessed assignments to a class scalar variable or class array element exist, the "yes" branch is taken and at step 240, a next assignment statement A to a class scalar variable V or array element E is selected.

If the assignment statement A is in the set N of statements that are not guaranteed to execute (step 250), then A is added to a list of "ineligible" assignments (step 260). (In reality, it is not necessary to maintain a separate list of "ineligible" assignments, since the list of "eligible" assignments is sufficient to support the process herein described, any assignment not on the "eligible" list being by implication "ineligible". Step 260 is shown for illustrative purposes to aid in understanding the algorithm of the preferred embodiment.) The process then returns to step 230 to consider the next assignment statement.

If the assignment statement A is not in the set N (i.e., is in the set Y), the "No" branch from step 250 is taken. The compiler then determines whether the right-hand side of assignment statement A is a compile time constant, an induction-relative value, or otherwise (step 270). The "right-hand side" refers to that part of an assignment statement which contains a mathematical or logical expression to be evaluated and assigned to some variable; by convention, in most programming languages this expression is placed to the right of an assignment operator, hence the term "right-hand side". A compile-time constant is any expression that the compiler can determine is a constant of a primitive type (integer, floating-point, etc.). The expression may reference other variables so long as the compiler can determine that the overall expression has a provably constant value. An "induction relative value" applies to the right-hand side of an assignment within a loop which uses the loop induction variable, provided of course that the loop induction variable is itself bounded by a compile-time constant. Assignments to array elements in a loop often use a loop induction variable to select the array element and to assign a value. If the right-hand side in an expression involving only constants and the loop induction variable, then it is "induction relative". For example, consider the following code loop:

```
for (i = 0; i < 10; i++) {
    a[i] = i*2;
}
```

Although a variable appears in the assignment statement a[i]=i*2, the variable is the loop induction variable and is limited in range. This would be considered an "induction-relative" statement.

If A's right-hand side contains something which is neither a compile time constant, nor an induction-relative value, then the "No" branch from step 270 is taken, and A is added to the "ineligible" list. Otherwise, the "Yes" branch is taken.

On taking the "Yes" branch from step 270, the compiler then determines whether the variable to which the "right-hand side" is being assigned is an array element, where the size of the array is not a compile-time constant. Clearly, where the array size is unknown, it is difficult or impossible to pre-initialize the array. Therefore, if the size of the array is anything other than a compile-time constant, the "yes" branch from step 280 is taken, and the assignment is added to the "ineligible" list. Although in the preferred embodiment any array assignment to a non-constant sized array is ineligible for pre-initialization, it would alternatively be possible to pre-initialize certain arrays of unknown size, if it is known in advance that there is a reasonably small limit on the array size. In this case, sufficient storage for the largest possible array size could be allocated in the image of the class variable structure, and this area could be pre-initialized on the assumption that the array is of that largest possible size.

If the "No" branch from step 250, the "yes branch from step 270, and the "No" branch from step 280, are taken, then the assignment statement is considered "eligible" for pre-initialization, and is added to the list of "eligible" assignments (step 290), and the process returns to step 230 to consider another assignment statement. When all assignment statements in method M have been processed as shown in steps 240–290, the "No" branch is taken from step 230, completing the analysis of instructions in method M (represented as step 140 in FIG. 1).

Referring again to FIG. 1, the compiler then applies class scalar variable initialization optimizations to assignment statements (to scalar variables) in method M. This process is represented in FIG. 1 as step 150, and shown in greater detail in FIG. 3.

Figure 3:
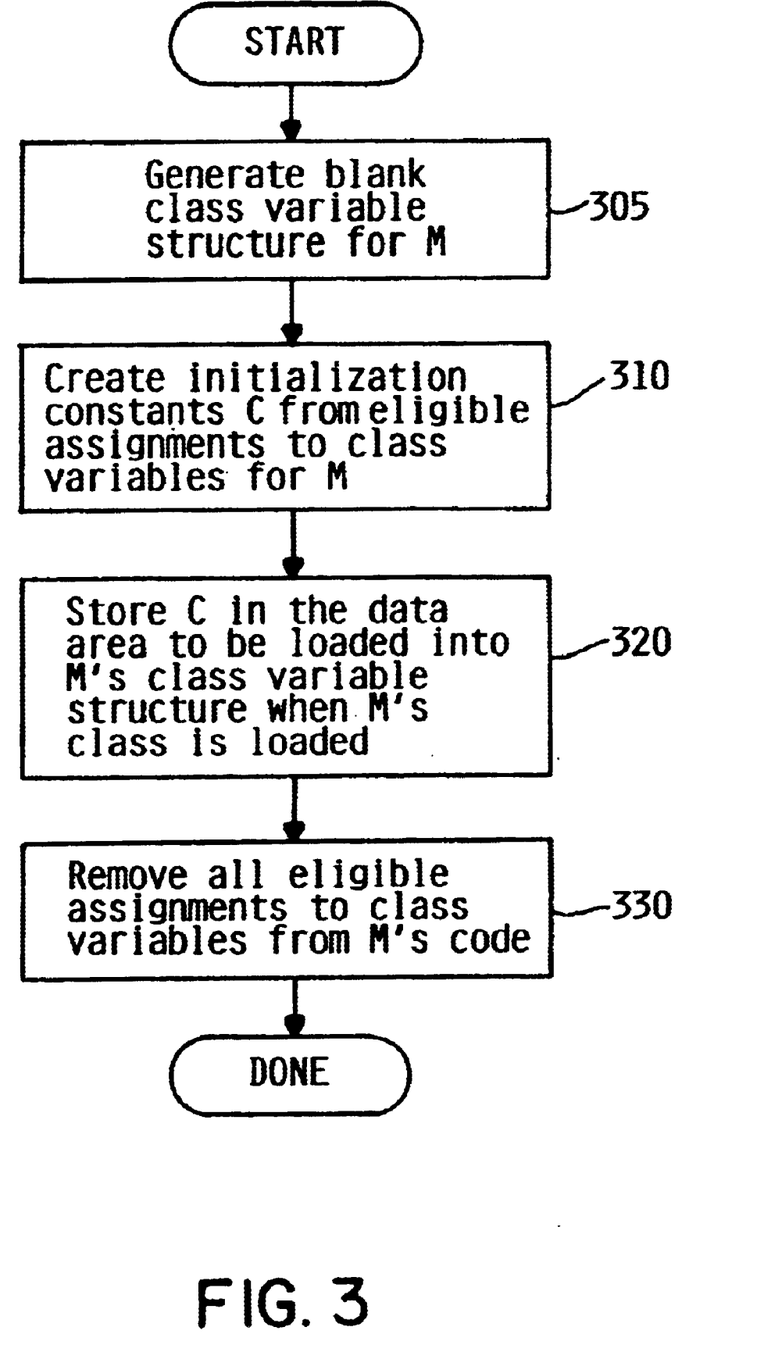
FIG. 3 is a flow diagram illustrating the process of applying class variable initialization optimizations to scalar variable assignments in an initialization method, according to the preferred embodiment.

Referring to FIG. 3, the compiler first lays out a blank map of a static storage area for the class variable structure (step 305). I.e., the compiler processes all class variable declarations to determine the size of storage needed to hold the static class variables, and lays out a map of the area, assigning each variable to a location within the class variable structure. The entire static storage area, regardless of data type, is initialized to binary zero values.

The compiler then evaluates each assignment statement from the "eligible" list in the order in which the assignments would be evaluated at run time according to the language definition. Each evaluation produces a constant, thus creating a set of initialization constants C which correspond to class variables (step 310). This set is then stored in the class variable structure storage area created in step 305, at the locations corresponding to the class variables which are the subjects of the assignments (step 320).

The compiler then removes all eligible assignments to scalar class variables from the method M's code (step 330). These assignments are now superfluous, since the variables affected by these assignments in the class variable structure have been pre-initialized.

Referring again to FIG. 1, the compiler then applies initialization optimizations to array initialization statements in method M. This process is represented in FIG. 1 as step 160, and shown in greater detail in FIG. 4.

Figure 4:
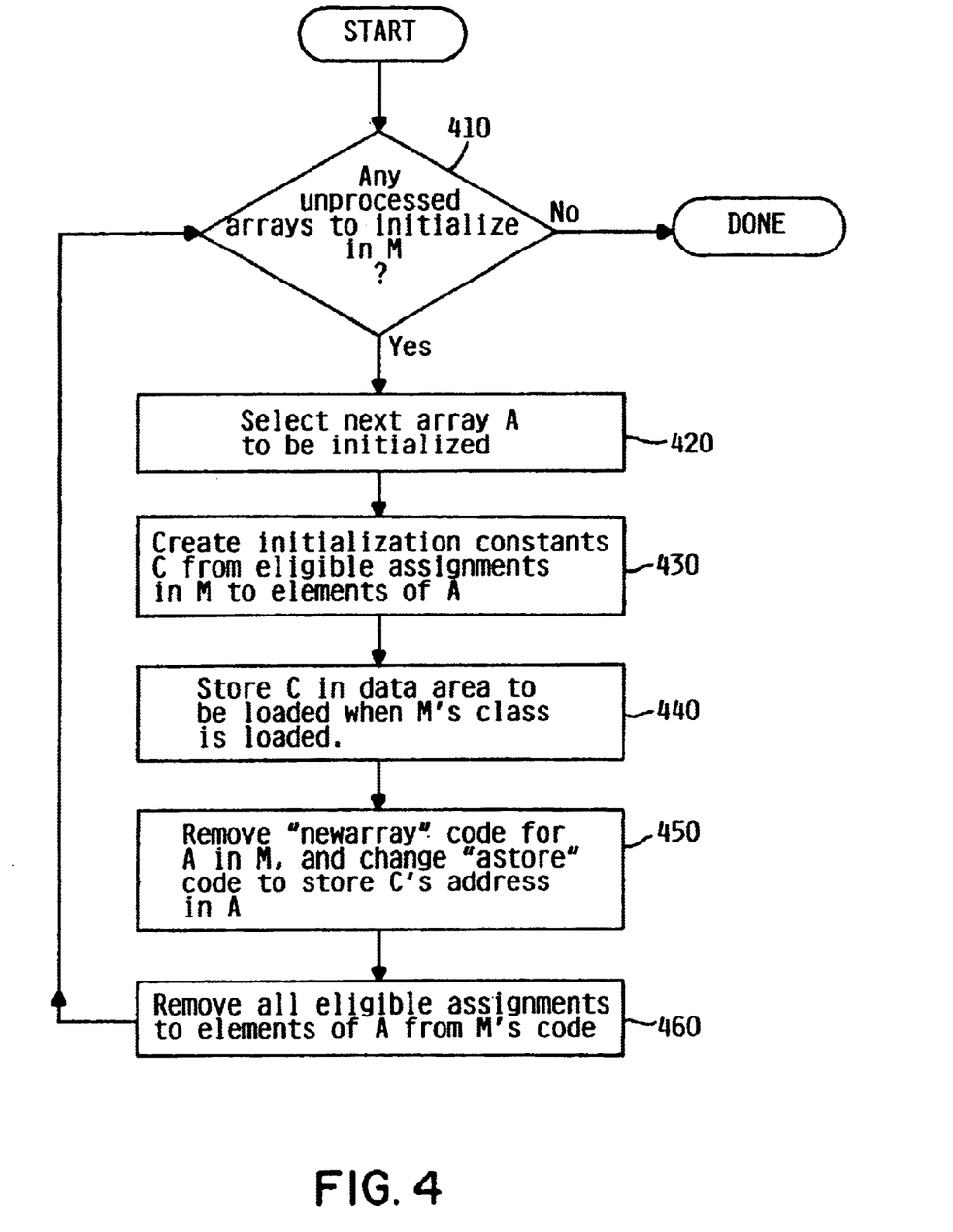
FIG. 4 is a flow diagram illustrating the process of applying initialization optimizations to array initialization statements in an initialization method, according to the preferred embodiment.

Referring to FIG. 4, the compiler determines whether there are any arrays left to process from the assignments on the "eligible" list (step 410), and if so, selects the next array A for initialization (step 420). An array is processed in this pre-initialization routine if there is at least one assignment statement to an array element on the "eligible" list; it is not necessary that all array elements be assigned non-zero values at compile time.

All assignment statements to elements in array A are evaluated in order of run-time execution to generate a set of constants C, each constant corresponding to a respective array element (step 430). This set of constants C is then stored in the class variable structure (created at step 305) in the locations assigned to the respective array elements (step 440).

The compiler removes, from method M's code, statements which allocate the array from the heap at run-time (step 450). Specifically, the "newarray" allocation statement is removed. The effect of "newarray" is to allocate the array from the heap at run-time and initialize it to zero; such a statement is superfluous, because the array will already be stored in a precompiled data area. At the same time, the "astore" statement following the original "newarray", which has the semantics of storing the address of the newly allocated array in the variable that is to receive it (i.e., a variable that will be used to reference the array), is changed to instead store the address of the precompiled data area containing the array (which is part of the class variable structure) in the variable that is to receive it. It will be recognized that "newarray" and "astore" are specific to the JAVA language, but that other object oriented languages may have analogous constructs.

The compiler then removes all eligible assignments to array elements in A from method M's code (step 460). These assignments are now superfluous, since the array has been pre-initialized in the compile-time image. The process then returns to step 410.

When all arrays have been processed as described above, the "No" branch is taken from step 410, completing FIG. 4 and step 160 in FIG. 1. This also completes the processing of method M, and the compiler returns to step 120 to consider whether any further <clinit>methods need be processed. When all such methods have been processed as described, the "No" branch is taken from step 120.

As shown in the figures and described above, the steps of FIGS. 3 are performed before those of FIG. 4, i.e., all scalar variable initialization statements are processed before any array variable initialization statements are processed. It should be understood that this is a simplified representation of the process for ease of understanding, and that in fact the different types of statements may be processed concurrently.

The compiler then completes the compilation of the JAVA bytecode program module in the conventional manner, represented as step 170. This in fact involves many steps which are not critical to an understanding of the present invention, and are not described in detail here. However, it is worth noting that as part of this conventional compilation process, those initialization statements in the <clinit> methods which were not removed from the code under compilation at steps 330, 450 or 460 are compiled into run-time executable code in the conventional manner, and will execute at run-time to initialize the appropriate class variables.

The compiled code thus generated will contain <clinit> methods which are generally smaller in size than code compiled under prior art methods. At the same time, the compiled code will contain static class variable structure images which are pre-initialized, while conventionally compiled code allocates and initializes this storage area at run-time. It will often be the case that the additional size of program modules due to these compile-time images will be more than offset by the reduction in the size of <clinit> methods due to removal of assignments and other statements, although it can't be guaranteed that this will always be the case. In general, however, there should be a run-time performance improvement.

Figure 5:
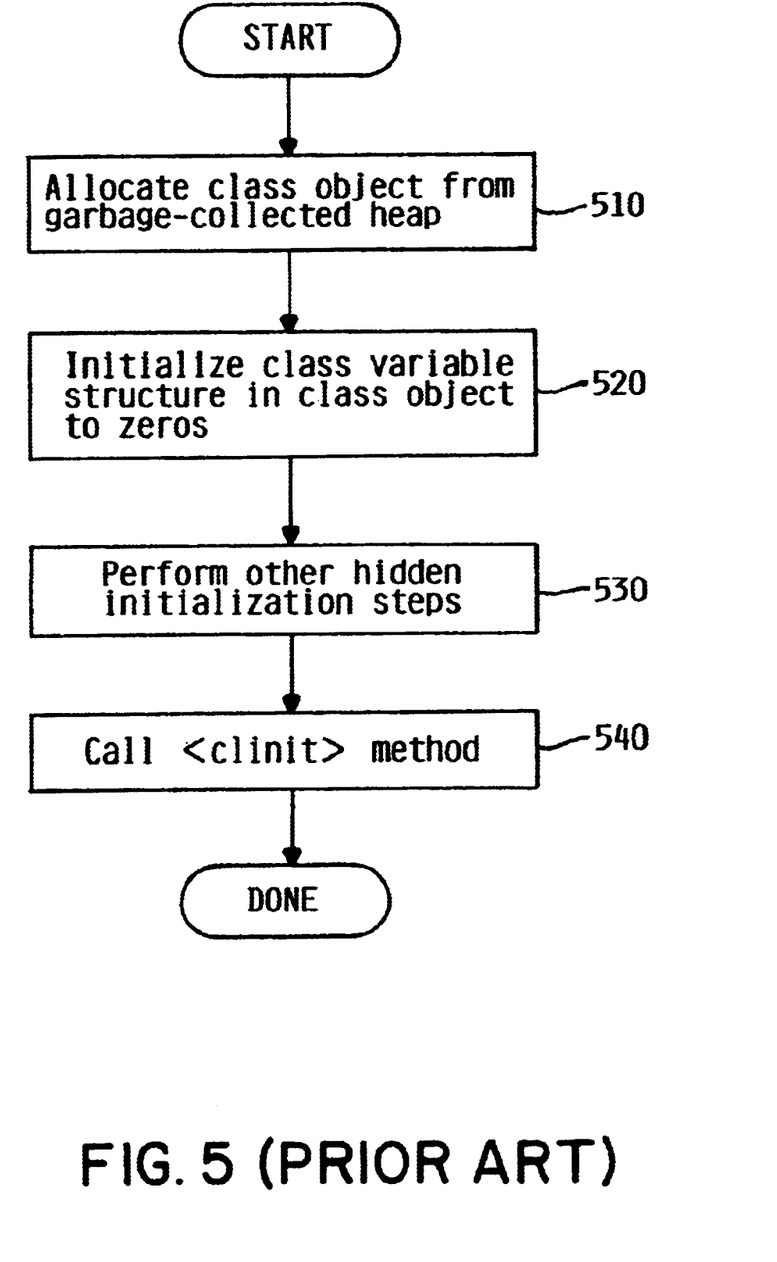
FIG. 5 illustrates the run-time class variable initialization process for JAVA code compiled in accordance with conventional methods.

FIG. 5 illustrates the run-time class variable initialization process for JAVA code compiled in accordance with conventional methods. As shown in FIG. 5, when a class is initially loaded, a class object is allocated from the heap, the allocated class object being used, among other things, for storing class variables (step 510). The class variable structure in the class object is then initialized to all zeroes (step 520). Certain additional steps required for initializing a class object are then performed; these are not considered significant to the present invention, and are simply represented conceptually in FIG. 5 as step 530. The <clinit> method is then called, and the full initialization code contained therein is executed (step 540). This completes the process of initializing a class.

Figure 6:
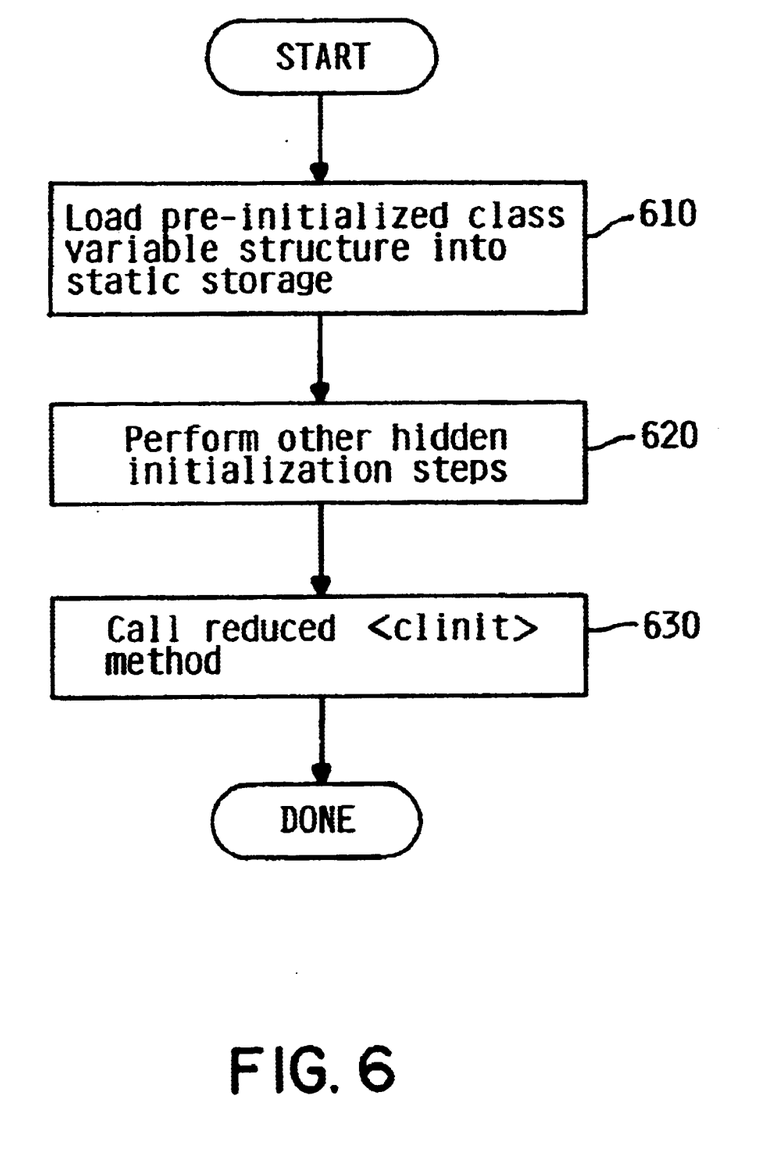
FIG. 6 illustrates the run-time class variable initialization process for JAVA code compiled in accordance with the preferred embodiment of the present invention.

FIG. 6 illustrates the run-time class variable initialization process for JAVA code compiled in accordance with the preferred embodiment of the present invention. Rather than allocate a class object from the heap at run-time, the pre-initialized class variable structure image (including arrays) is loaded into static storage (step 610). The additional steps required for class initialization, represented by step 530, are then performed, as in the conventional case. A<clinit>method is then called, but the <clinit> method of the preferred embodiment is a smaller, reduced <clinit> method (step 640). As described above, this reduced <clinit> method generally contains fewer instructions and will execute much faster. Moreover, the loading of a pre-initialized image at step 610 is generally faster than the corresponding prior art steps of allocating a comparably sized space from the heap, and initializing it to all zeroes.

Figure 7:
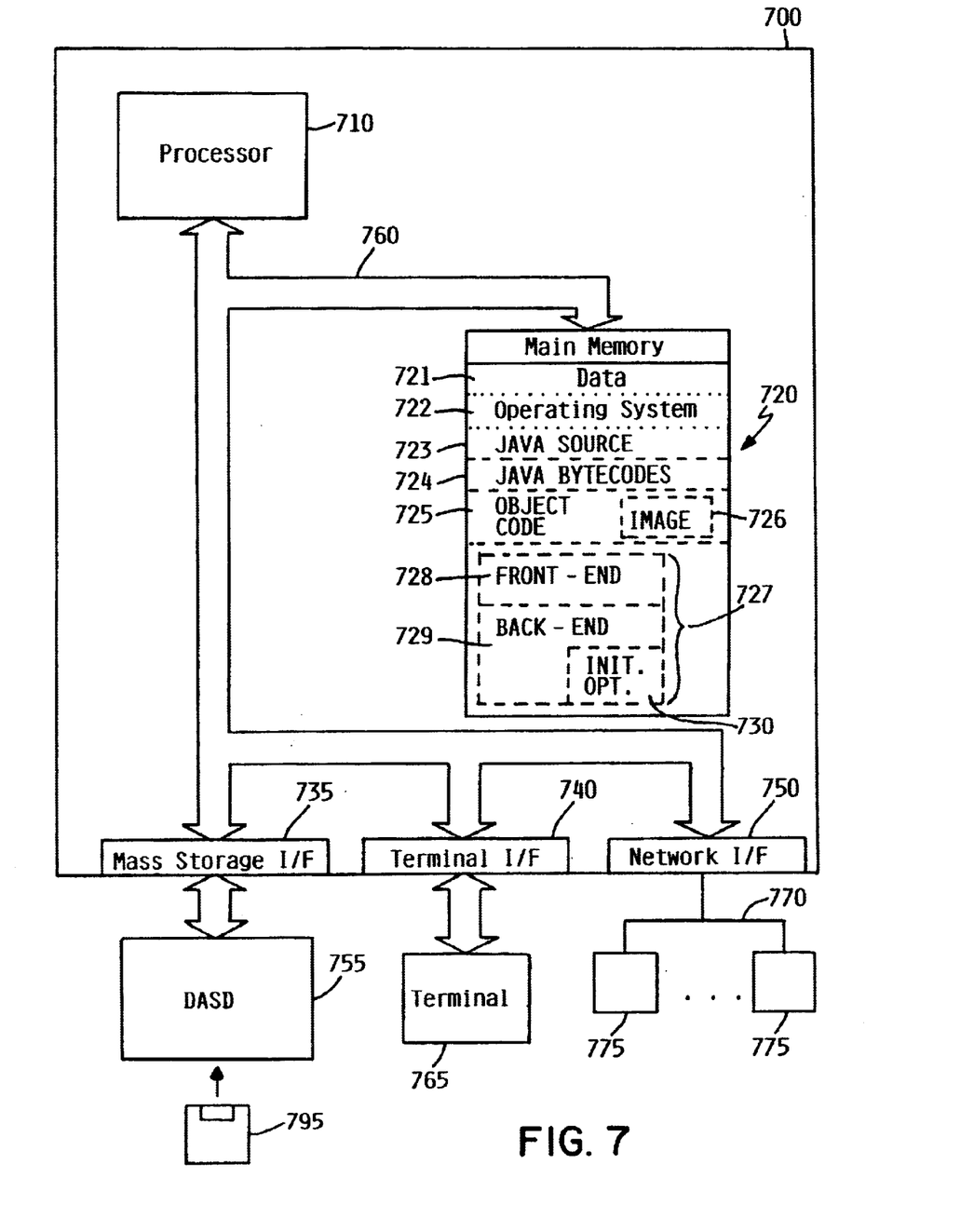

While the invention thus far has been described as computer-implemented methods, the invention could also be practiced as an apparatus that performs the method steps previously discussed. Referring to FIG. 7, a computer system 700 in accordance with the preferred embodiment is an IBM AS/400 computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 7, computer system 700 comprises a processor 710, a main memory 720, a mass storage interface 735, a terminal interface 740, and a network interface 750. These system components are interconnected through the use of a system bus 760. Mass storage interface 735 is used to connect mass storage devices (such as a direct access storage device 755) to computer system 700. One specific type of direct access storage device 755 is a floppy disk drive, which may store data to and read data from a floppy disk 795.

Main memory 720 in accordance with the preferred embodiments contains data 721, an operating system 722, and object-oriented program compiler 727, which is preferably a JAVA compiler. Main memory further contains one or more a JAVA source code program modules 723, one or more intermediate level JAVA bytecode program modules 724, and one or more machine executable code modules 725, each containing a pre-initialized storage image 726 for holding pre-initialized class variables. In the preferred embodiments, compiler 727 is a JAVA compiler, containing front-end compiler 728 for translating JAVA source code 723 into JAVA bytecode 724, and a back-end compiler 729 for compiling JAVA bytecode 724 program modules into machine executable (object code) modules 725 in accordance with the method shown in FIG. 1. Back-end compiler 729 includes initialization optimizer 730 for optimizing the initialization of static class variables as described above herein and shown in FIGS. 2–4. Note that compiler 727 in FIG. 7 is shown to contain each of the front-end compiler 728, back-end compiler 729, and initialization optimizer 730. However, each of these items could also be provided separately.

Computer system 700 utilizes well known virtual addressing mechanisms that allow the programs of computer system 700 to behave as if they only have access to a large, single storage entity instead of access to multiple, smaller storage entities such as main memory 720 and storage device 755. Therefore, while data 721, operating system 722, OO programs 723, 724, 725, and object oriented program compiler 727 are shown to reside in main memory 720, those skilled in the art will recognize that these items are not necessarily all completely contained in main memory 720 at the same time. It should also be noted that the term "memory" is used herein to generically refer to the entire virtual memory of computer system 700.

Data 721 represents any data that serves as input to or output from any program in computer system 700. Operating system 722 is a multitasking operating system known in the industry as OS/400; however, those skilled in the art will appreciate that the spirit and scope of the present invention is not limited to any one operating system. Object oriented source program 723 is preferably in the JAVA language, but could be written in a different object oriented or object based language, containing one or more statements that create and initialize object classes.

Processor 710 may be constructed from one or more microprocessors and/or integrated circuits. Processor 710 executes program instructions stored in main memory 720. Main memory 720 stores programs and data that processor 710 may access. When computer system 700 starts up, processor 710 initially executes the program instructions that make up operating system 722. Operating system 722 is a sophisticated program that manages the resources of computer system 700. Some of these resources are processor 710, main memory 720, mass storage interface 735, terminal interface 740, network interface 750, and system bus 760.

Although computer system 700 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 710. However, those skilled in the art will appreciate that the present invention applies equally to computer systems that simply use I/O adapters to perform similar functions.

Terminal interface 740 is used to directly connect one or more terminals 765 to computer system 700. These terminals 765, which may be non-intelligent (i.e., dumb) terminals or fully programmable workstations, are used to allow system administrators and users to communicate with computer system 700. Note, however, that while terminal interface 740 is provided to support communication with one or more terminals 765, computer system 700 does not necessarily require a terminal 765, because all needed interaction with users and other processes may occur via network interface 750.

Network interface 750 is used to connect other computer systems and/or workstations (e.g., 775 in FIG. 7) to computer system 700 across a network 770. The present invention applies equally no matter how computer system 700 may be connected to other computer systems and/or workstations, regardless of whether the network connection 770 is made using present-day analog and/or digital techniques or via some networking mechanism of the future. In addition, many different network protocols can be used to implement a network. These protocols are specialized computer programs that allow computers to communicate across network 770. TCP/IP (Transmission Control Protocol/Internet Protocol) is an example of a suitable network protocol.

At this point, it is important to note that while the preferred embodiment of the present invention has been and will continue to be described in the context of a fully functional computer system, the various embodiments of the invention are capable of being distributed as a program product in a variety of forms, and that the present invention applies equally regardless of the particular type of signal-bearing media used to actually carry out the distribution. Examples of suitable signal-bearing media include, but are not limited to, recordable type media such as volatile and non-volatile memory devices, floppy disks, hard-disk drives, CD ROMs, DVD's, magnetic tape, and transmission type media such as digital and analog communications links, including wireless communication links. Examples of signal-bearing media are illustrated in FIG. 7 as diskette 795, DASD 755, and memory 720.

In the discussion above, the method and apparatus herein disclosed have been described as applicable to the JAVA programming language, the JAVA language being a widely understood object-orientated language which is subject to the problems above described, specifically, excessive and inefficient initialization code. However, it will be understood that the present invention could be applied to other programming languages having similar characteristics.

Although a specific embodiment of the invention has been disclosed along with certain alternatives, it will be recognized by those skilled in the art that additional variations in form and detail may be made within the scope of the following claims:

What is claimed is:

1. A method for compiling object-oriented programming code in a programming language which employs run-time static initialization semantics, comprising the computer-executed steps of:
    identifying a first set of run-time static initialization instructions contained in a called portion of said object-oriented programming code said run-time static initialization instructions affecting a plurality of static storage values;
    analyzing said first set to identify a second set of run-time static initialization instructions, said second set being a subset of said first set, wherein each run-time static initialization instruction of said second set must logically execute whenever said called portion of said object oriented programming code is called;
    generating an initial static storage image for said called portion of said object-oriented programming code, wherein each static storage value affected by a at least one run-time static initialization instruction of said second set is initialized in said initial static storage image to a respective initialized state said respective initialized state being identical to a state of the corresponding static storage value produced by executing the respective at least one run-time static initialization instruction of the second set; and
    generating run-time executable instructions for each instruction of said first set which is not contained in said second set, while generating no run-time executable instructions for the instructions of said second set.

2. The method for compiling object-oriented programming code of claim 1, wherein said object-oriented programming code is written in the JAVA language.

3. The method for object-oriented programming code compilation of claim 1, wherein said second set includes at least one instruction initializing an element of an array.

4. The method for object-oriented programming code compilation of claim 1, wherein said step of analyzing said first set to identify a second set of run-time static initialization instructions comprises constructing a control flow graph for said first set of run-time static initialization instructions.

5. The method for object-oriented programming code compilation of claim 4, wherein said step of analyzing said first set to identify a second set of run-time static initialization instructions comprises the steps of:
    using said control flow graph to identify a third set, said third set being a subset of said first set, wherein each run-time state initialization instruction of said third set must logically execute whenever said called portion of said object oriented programming code is called; and
    removing selected statements from said third set to produce said second set, said selected statements being removed comprising statements initializing array elements, where the array is of non-constant size.

6. The method for object-oriented programming code compilation of claim 4, wherein
said step of analyzing said first set to identify a second set of run-time static initialization instructions comprises the steps of:
    using said control flow graph to identify a third set, said third set being a subset of said first set, wherein each run-time state initialization instruction of said third set must logically execute whenever said called portion of said object oriented programming code is called; and
    removing selected statements from said third set to produce said second set, said selected statements being removed comprising initialization statements, wherein the value assigned by the initialization statement depends on a variable.

7. The method for object-oriented programming code compilation of claim 4, wherein said step of analyzing said first set to identify a second set of run-time static initialization instructions comprises:
    identifying a third set, said third set being a subset of said first set, said third set consisting of all statements S for which (a) every path in said control flow graph from an entry point of said called portion to an exit from said called portion contains S, and (b) there is no path from said entry point to statement S that passes through an instruction which may cause an exception before reaching S the first time.

8. A computer program product for compiling object-oriented programming code in a programming language which employs run-time static initialization semantics on at least one computer system, said computer program product comprising:

a plurality of computer executable instructions recorded on signal-bearing media, wherein said instructions, when executed said at least one computer, cause the at least one computer system to perform the steps of:

identifying a first set of run-time static initialization instructions contained in a called portion of said object-oriented programming code said run-time static initialization instructions affecting a plurality of static storage values;

analyzing said first set to identify a second set of run-time static initialization instructions, said second set being a subset of said first set, wherein each run-time static initialization instruction of said second set must logically execute whenever said called portion of said object oriented programming code is called;

generating an initial static storage image for said called portion of said object-oriented programming code, wherein each static storage value affected by a at least one run-time static initialization instruction of said second set is initialized in said initial static storage image to a respective initialized state said respective initialized state being identical to a state of the corresponding static storage value produced by executing the respective at least one run-time static initialization instruction of the second set; and generating run-time executable instructions for each instruction of said first set which is not contained in said second set, while generating no run-time executable instructions for the instructions of said second set.

9. The computer program product for compiling object-oriented programming code of claim 8, wherein said object-oriented programming code is written in the JAVA language.

10. The computer program product for object-oriented programming code compilation of claim 8, wherein said second set includes at least one instruction initializing an element of an array.

11. The computer program product for object-oriented programming code compilation of claim 8, wherein said step of analyzing said first set to identify a second set of run-time static initialization instructions comprises constructing a control flow graph for said first set of run-time static initialization instructions.

12. The computer program product for object-oriented programming code compilation of claim 11, wherein said step of analyzing said first set to identify a second set of run-time static initialization instructions comprises the steps of:

using said control flow graph to identify a third set, said third set being a subset of said first set, wherein each run-time state initialization instruction of said third set must logically execute whenever said called portion of said object oriented programming code is called; and removing selected statements from said third set to produce said second set, said selected statements being removed comprising statements initializing array elements, where the array is of non-constant size.

13. The computer program product for object-oriented programming code compilation of claim 11, wherein said step of analyzing said first set to identify a second set of run-time static initialization instructions comprises the steps of:

using said control flow graph to identify a third set, said third set being a subset of said first set, wherein each run-time state initialization instruction of said third set must logically execute whenever said called portion of said object oriented programming code is called; and removing selected statements from said third set to produce said second set, said selected statements being removed comprising initialization statements, wherein the value assigned by the initialization statement depends on a variable.

14. The computer program product for object-oriented programming code compilation of claim 11, wherein said step of analyzing said first set to identify a second set of run-time static initialization instructions comprises:

identifying a third set, said third set being a subset of said first set, said third set consisting of all statements S for which (a) every path in said control flow graph from an entry point of said called portion to an exit from said called portion contains S, and (b) there is no path from said entry point to statement S that passes through an instruction which may cause an exception before reaching S the first time.

15. A computer system, comprising:

a processor;

a memory;

a compiler embodied as a plurality of processor executable instructions recorded in said memory, said compiler compiling object-oriented programming code in a programming language which employs run-time static initialization semantics, said compiler receiving non-executable code in said language which employs run-time static initialization semantics, said non-executable code including static variable initialization statements, and producing executable object code including an image of initialized static class variables, said compiler including a static class variable optimizer function, wherein said optimizer function:

(a) identifies a first set of selected static variable initialization statements which are eligible for non-inclusion in run-time static initialization object code;

(b) initializes said image of initialized static class variables to an initialized state, said initialized state being identical to a state of said image produced by executing the statements in said set of selected static variable initialization statements; and (c) generates run-time static initialization object code from said static variable initialization statements which are not included in said first set.

16. The computer system of claim 15, wherein said compiler comprises:

a front-end portion for receiving human readable source code in said object-oriented programming language and producing code in a platform-independent, intermediate form; and a back-end portion for receiving code in said platform-independent, intermediate form and producing executable object code, said static class variable optimizer function being a part of said back-end portion.

* * * * *